United States Patent [19]

Shepard et al.

[11] Patent Number: 5,269,636
[45] Date of Patent: Dec. 14, 1993

[54] APPARATUS AND METHOD FOR TRANSFERRING DRY BULK MATERIALS HAVING AN IMPROVED LOADING PAN

[75] Inventors: James M. Shepard, Hockessin, Del.; Michael J. Schunk, Boonton, N.J.

[73] Assignee: General Chemical Corporation, Parsippany, N.J.

[21] Appl. No.: 791,497

[22] Filed: Nov. 12, 1991

[51] Int. Cl.⁵ ............... B65G 53/30; B65G 53/24; B65G 53/36; B65G 53/40
[52] U.S. Cl. .................... 406/109; 406/122; 406/124; 406/153; 406/145
[58] Field of Search ............ 406/145, 151, 124, 125, 406/126, 108, 109, 122, 113, 115, 153

[56] References Cited

U.S. PATENT DOCUMENTS

| Re. 24,916 | 12/1960 | Oliver | 406/145 X |
| Re. 26,424 | 7/1968 | Kemp et al. | 406/145 X |
| 2,190,726 | 2/1940 | McKenna | 406/145 |
| 2,378,553 | 6/1945 | Hornbrook | 406/122 |
| 2,393,932 | 1/1946 | Petroe | 406/122 X |
| 2,629,637 | 2/1953 | Hornbrook | 406/145 X |
| 2,695,196 | 11/1954 | Talmey et al. | 406/145 X |
| 2,844,411 | 7/1958 | Aller | 406/125 X |
| 3,445,140 | 5/1969 | Nagy | 406/145 |
| 3,451,726 | 6/1969 | Nagy | 406/145 |
| 3,637,262 | 1/1972 | Adler | 406/145 X |
| 4,884,925 | 12/1989 | Kemp et al. | 406/109 |

FOREIGN PATENT DOCUMENTS 319349 6/1989 European Pat. Off. ........... 406/145

Primary Examiner—Margaret A. Focarino
Assistant Examiner—James M. Kannofsky
Attorney, Agent, or Firm—Mathews, Woodbridge & Collins

[57] ABSTRACT

The present invention comprises an unloading pan for bulk dry particulate matter, such as soda ash. The pan comprises a pan inlet and a pan outlet. The pan is preferably designed wherein the source of particulate matter is a railroad car having a car outlet at the bottom to gravity unload therethrough. There is a means to position, and preferably attach, the pan container at the outlet to the source of particulate matter, i.e., the outlet of the railroad car.

23 Claims, 5 Drawing Sheets

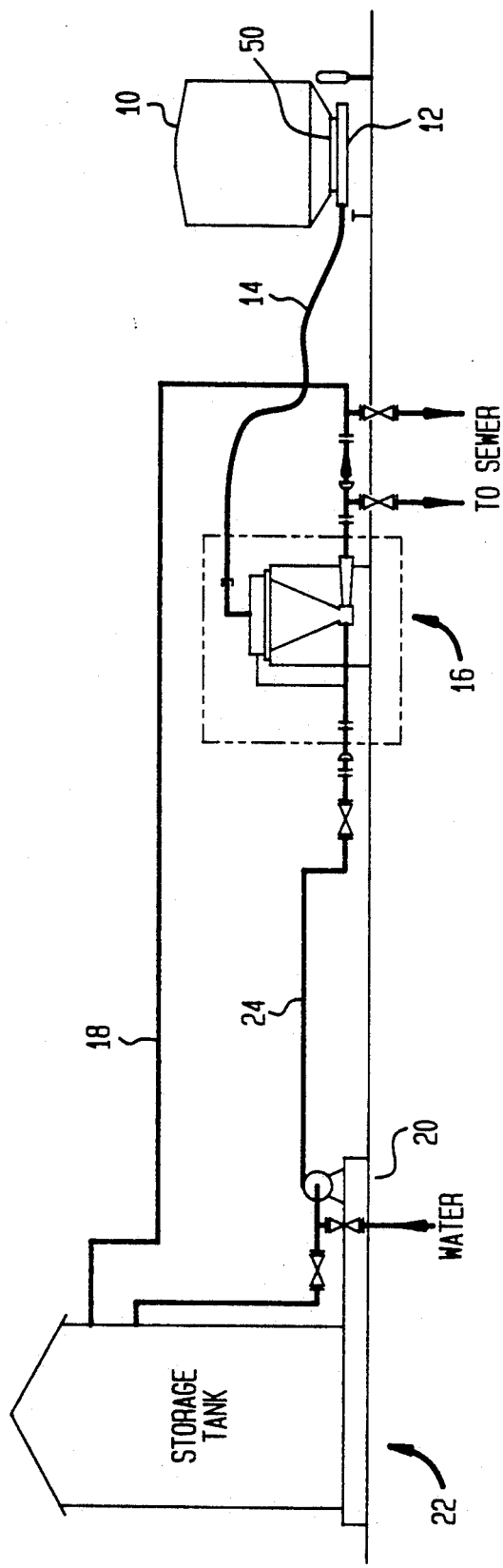

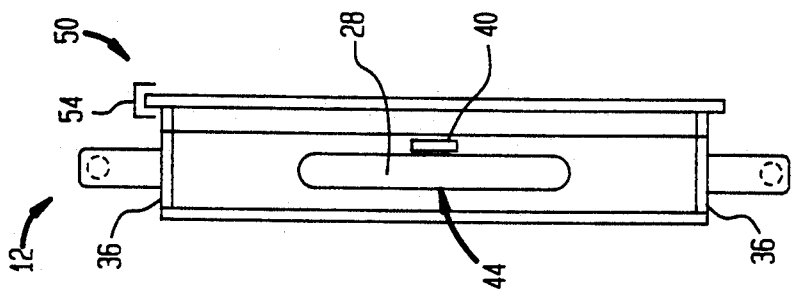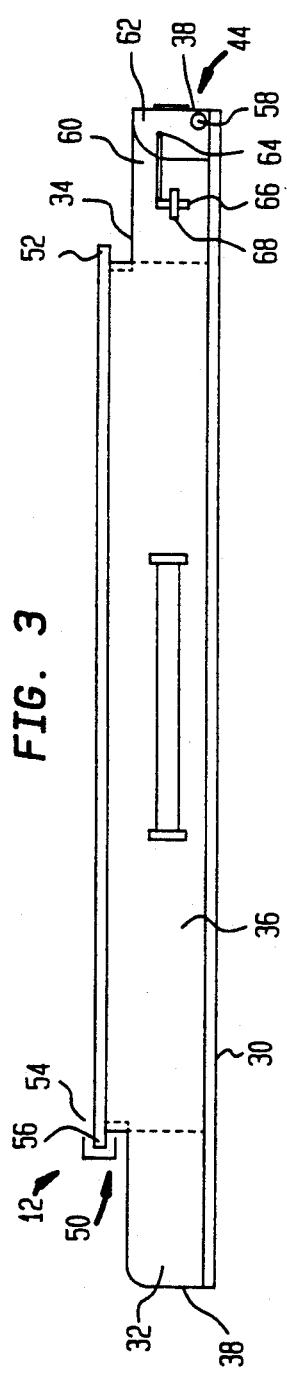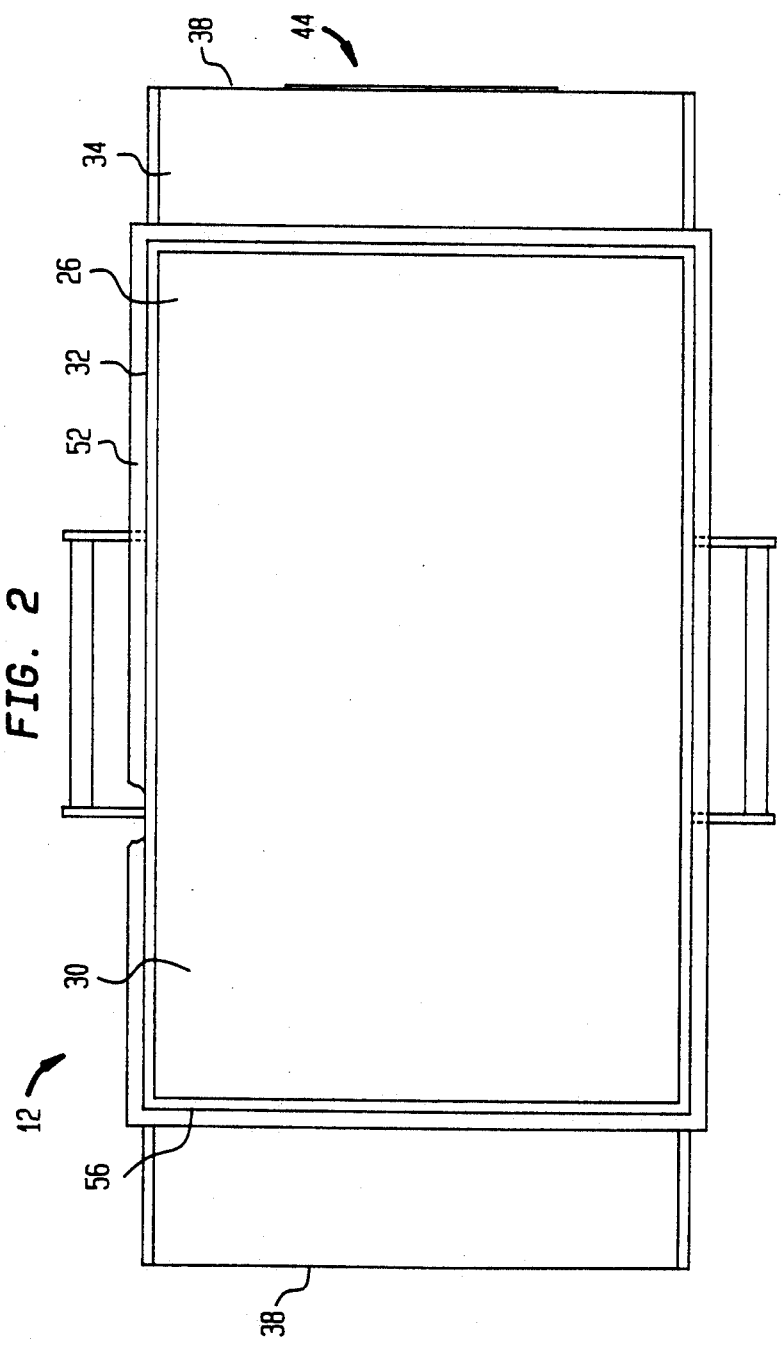

APPARATUS AND METHOD FOR TRANSFERRING DRY BULK MATERIALS HAVING AN IMPROVED LOADING PAN

BACKGROUND OF THE INVENTION

1. Field of the Invention

This application relates to an adapter pan for transferring dry chemicals to and from a storage container, such as a railroad truck, ship or storage tank in a related system and method. The invention is particularly suitable for use with chemicals which form hydrates, in particular soda ash, which can contain larger particles which are difficult to handle.

2. Description of Related Art

Various means have been described for transferring dry materials out of containers. For example, U.S. Pat. No. 3,512,842 describes a method for unloading railroad car, in which a slurry is formed inside the railroad car and then is pumped out. Such a process has numerous drawbacks, however, including the risk of overflowing or foaming within the car; the need for specialized railroad cars adapted for use in the slurrying process; the possibility of corrosive solutions being formed and damaging the railroad car; problems with residual moisture causing caking in subsequent shipments; and the formation of hard, slowly dissolving lumps when liquid is added to a large quantity of solid. A similar approach is described in U.S. Pat. No. 4,189,262.

Eductors have been used and are still used to transfer dry chemicals as a slurry, solution or solid. For example, liquid driven eductors have been used to slurry dry polymers and activated carbon in the water treatment industry and to transfer fly ash in the electric power industry. Also air, steam, and liquid driven eductors have been used for transfer of solids. However, problems are known to exist with eductor-based handling systems.

For example, air driven eductors require a high power input and air flow per unit mass of solid conveyed resulting in high energy costs and higher capital cost for dust collection equipment. Steam driven eductors are used to create a vacuum for pneumatic conveying of dry solids to a solid-liquid mixing apparatus. The systems using steam driven eductors which are known to the inventors require a large amount of support equipment including a barometric leg for condensing the steam with modifications for solid-liquid mixing, and a large steam supply. Since the solid is conveyed by vacuum, the steam driven eductor system is limited by economics to installations where it can be located near, e.g. within a few hundred feet of, the container of dry chemical.

Liquid driven eductors do not require large volumes of air or steam and can be used to transfer dry chemicals from a container, such as a railroad car, forming a solution or slurry of the chemical in the liquid carrier medium. Liquid driven eductors are known to be successfully used to prepare dilute solutions of polymer in water as well as to transfer insoluble materials, e.g. activated carbon, to storage as a slurry.

Commonly assigned U.S. Pat. No. 4,884,925, discloses a apparatus and method for transfer and slurrying or dissolving hydratable dry bulk chemicals hereby incorporated by reference.

Dry bulk material is brought in a storage container, such as a railroad car, and is discharged by gravity to an adapter pan immediately beneath the railroad car. Such pans as are typically used are flat pans open along at least one transverse side and the top. The dry material falls from the railroad car into the pan and is sucked by a flexible hose communicating to an eductor into a hydrator hopper. Such pans have raised environmental concerns regarding dust from the open pan contaminating the environment.

The disclosed hydrator has a sealed solvation hopper positioned between a liquid driven eductor and a fitting for connection to a storage container such as a railroad car. At the inlet end of the solvation hopper is a chemical inlet pipe which connects the interior to the exterior of the hopper. Surrounding the inlet pipe are a plurality of nozzles for introduction of solvation liquid into the hopper. The nozzles are disposed such that the solvation liquid washes the interior surface of the hopper to prevent plugging by hydrates (solvates) which may be formed. The outlet end of the hopper is connected to a suction opening of the liquid driven eductor.

In operation, liquid flowing through the eductor creates a suction and draws dry chemical out of the storage container and into the hopper. In the hopper, solvation liquid is supplied through the nozzles to wet the dry chemicals and to wash the surfaces of the hopper, pushing the wetted material toward the outlet end of the hopper. At the outlet end of the hopper, the wetted material is sucked out of the eductor where it is combined with the flow of eductor liquid. The material leaving the eductor is recovered and sent to storage or directly for processing. The process and apparatus are particularly useful for handling soda ash.

A technical bulletin entitled *Soda Ash/Technical/Handling*, published by the General Chemical Corporation, 1988 reviews the handling of soda ash. This manual discloses the unloading of soda ash beginning at page 24 where various means to unload soda ash are disclosed. One approach to dust during unloading is to use a flexible shroud between an outlet of a storage car and a conveyor. The soda ash falls by gravity from the outlet of the car through the shrouds and directly into the conveyor.

However, certain railroad cars have large outlet openings that require flat pans to be attached underneath and the opening put into communication with the inlet of the pan. The soda ash falls directly into the pan. In these operations the pans have open sides and the soda ash simply falls out of the open sides onto the surrounding ground or is vacuumed from the open sides. The General Chemical bulletin discloses that certain railroad cars are adapted for direct attachment to pneumatic hoses whereby the soda ash can be vacuum transferred directly from the car.

While improvements have been made in the design and apparatus of unloading bulk soda ash, there are still a large number of railroad cars which are designed with outlets which fit broad, flat pans. It is desirable to be able to continue to use such railroad cars.

SUMMARY OF THE INVENTION

The present invention is directed to an improved apparatus and method for transfer of solid particulate material from a storage container, particularly a railroad car, for subsequent storage and/or processing. It is the goal of the present invention to be able to use railroad cars having large discharge outlets which can discharge into a flat loading pan with a minimum of exposure of the particulate material to the environment.

The present invention comprises an unloading pan for bulk dry particulate matter, such as soda ash. The pan comprises a pan inlet and a pan outlet. The pan of the present invention is preferably designed wherein the source of particulate matter is a railroad car having a car outlet at the bottom to gravity unload therethrough. There is a means to position, and preferably attach, the pan container at the outlet to the source of particulate matter, i.e., the outlet of the railroad car. The pan and the source communicate through the pan inlet and the source outlet.

The interior of the railroad car feeds through the pan inlet into the pan chamber, through the bottom outlet of the railroad car by gravity. There is a minimum of dust leakage between the pan inlet and the source outlet. In the preferred embodiment, there is a flange around the pan inlet which fits into a corresponding groove around the outlet from the railroad car. The pan flange slides into the railroad car outlet groove and provides a mating which results in a minimum of leakage of dust. Alternatively, the flange can be attached to the railroad car outlet and the pan inlet can contain a groove.

The pan has an outlet from which the solid particulate matter can be removed. There is an openable outlet closure which is normally maintained in a closed position by a spring or other suitable means. When the pan is to be unloaded, the outlet is opened and a vacuum tube can be inserted therein and remove the particulate matter with a minimum of dust entering the environment.

The preferred pan comprises a base, at least one lateral wall, and preferably a lateral wall having a rectangular perimeter. The lateral wall is attached to the base and forms an enclosed perimeter. There is a top attached to the lateral wall attached opposite the base with the inlet passing through the top and the outlet passing through the lateral wall in preferred designs.

The pan of the present invention is preferably used in a system which comprises a storage container having a suitable outlet to gravity unload into the above-described pan. The openable pan outlet enclosure is in a normally closed position. There is a hydrator preferably comprising a means to draw solid particulate material from the pan outlet and a means to hydrate the solid particulate material. There is a conduit which communicates from the hydrator and has a vacuum end.

The pan outlet is opened and the vacuum end of the conduit is positioned in the open outlet. The solid particulate material is transferred to the hydrator where it is formed into a hydrated mixture, or slurry. There is a means to transfer the hydrated solid particulate material from the hydrator.

A preferred hydrator comprises a solvation hopper comprising a hopper wall, a hopper inlet and a hopper outlet to a hopper chamber. There is preferably a hopper inlet conduit sealingly communicating with the hopper through the hopper inlet. The hopper inlet conduit is in communication with the pan through the pan outlet. The hydrator preferably comprises a liquid driven eductor comprising an eductor liquid inlet and an eductor outlet and an eductor suction opening. The eductor suction opening is in sealed communication with the hopper outlet. The system further comprises a slurry storage tank in communication with the eductor outlet. A transfer means between the slurry storage tank and the eductor outlet helps to transfer the slurry to the storage tank.

The present invention comprises a method of connecting an unloading pan as recited above to a source of particulate solids, preferably the gravity outlet at the bottom of a railroad car. The pan outlet is opened into communication with the hydrator. The particulate solid is drawn from the pan outlet into the hydrator. Communication can be broken with the hydrator by closing the pan outlet.

BRIEF DESCRIPTION OF THE DRAWINGS

FIG. 1 is a schematic drawing of the system for use with the apparatus and method of the present invention.

FIG. 2 is a top view of a preferred embodiment of a pan useful in the present invention.

FIG. 3 is a side view of the pan shown in FIG. 2.

FIG. 4 is an end view of the pan shown in FIG. 3.

FIG. 10 is a partial, sectional view of the top of the hopper showing one nozzle disposed to pass fluid into the hopper.

DESCRIPTION OF THE PREFERRED EMBODIMENTS

Figure 5:
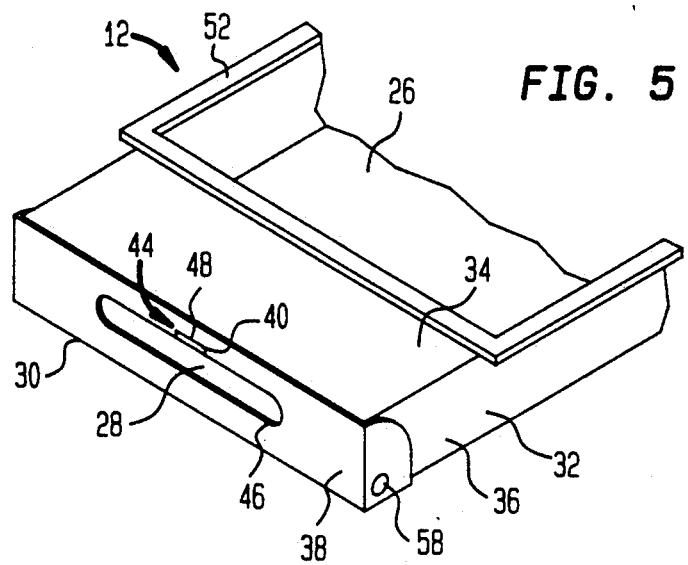
FIG. 5 is a view in perspective showing the end view of as pan containing an openable outlet port in normally closed position.

The present invention will be understood by those skilled in the art by reference to the accompanying figures.

FIG. 1 illustrates a system including the apparatus of the present invention. During typical operation, a source of dry particulate chemical is brought to the system from a suitable container. Typically, the container can be a dry particulate storage container, but more commonly it is a transportation container such as a truck or railroad car 10. In accordance with the system of the present invention, the contents can be unloaded from the railroad car into an adapter pan 12. The particulate material is preferably a free flowing material such as soda ash.

The particulate material is continually removed from railroad car 10 through an adaptor pan 12 and then through a suitable conduit such as a flexible hose 14. The driving force to remove the free flowing particulate powder from the railroad car can be gravity or air pressure. The particulate material can be transferred using a suction force created by a fluid eductor which can also be used as part of an apparatus which hydrates the powdered or particulate material.

The particulate material flows from the adaptor pan 12 through a flexible hose 14, to hydrator 16. The hydrator converts the particulate material to a slurry or solution which will be referred to as hydrated particulate solids. The hydrated particulate solids are then transferred through a hydrated solid transfer line 18, using a suitable transfer means such as a pump 20 to a hydrated solid storage tank 22. During storage, some of the liquid may rise to the top of the stored solids. This liquid can be recycled back through recycle line 24 to the hydrator 16 for use in the eductor therein, or simply sent to a waste area.

A preferred and useful unloading pan for the present invention is illustrated in FIGS. 2 through 7. The container or pan is substantially enclosed and comprises a pan inlet 26 and a pan outlet 28. The pan preferably comprises a base 30, at least one lateral wall 32 which forms an enclosed perimeter, and a top 34 attached to lateral wall 32 opposite base 30. The lateral wall 32 is preferably rectangular having four lateral sides. There are two opposite sides 36 and two opposite ends 38. There is at least one outlet 28 and at least one end 38 of the lateral wall 32. In the embodiment shown in FIGS. 2 through 4, there is a pan outlet 28 in only one lateral end 38. Preferably, there is a pan outlet 28 in each lateral end 38.

The pan outlet 28 preferably comprises an automatic closing means 40. The automatic closing means can be any suitable closing means which is in a normally closed position. A preferred and useful automatic closing means comprises a spring loaded cap 44. The spring loaded cap comprises a cap 46 which normally closes pan outlet 28. Cap 46 is held in a normally closed position by spring 48. The spring 48 is interconnected between the cap 46 and the pan 12, preferably at end 38 of the lateral wall at which the pan outlet 28 passes. A preferred pan outlet 28 is elongated so that hose 14 can be swept around the inside of the pan. A useful outlet is a slot about 3.5 to 4 inches high and 8 to 12 inches wide.

In the preferred system of the present invention, as illustrated in FIG. 1, the adapter pan 12 is designed to be juxtaposed between a source of particulate matter which is railroad car 10. The railroad car has a car outlet 50 at the bottom of the railroad car to gravity unload the particulate matter.

There are suitable means to attach the pan 12 to the railroad car 10 so that the railroad car outlet 50 is in communication with the pan inlet 26. A useful and preferred means of attachment is a flange 52 around the perimeter of the pan inlet 26. The railroad car outlet 50 has corresponding grooves 54 around the railroad car outlet 50. Such grooves 54 can be disposed around the railroad car outlet 50 to receive the flanges along sides 32, and optionally and preferably at one end 56.

At least a section of the lateral wall can open, preferably the whole lateral end in which the outlet opening is located can be opened. In a preferred pan of the present invention, at least one lateral side 36 or lateral end 38 is openable. Preferably, opposite ends 38 are openable. Referring to FIGS. 2 through 7, one lateral end 38 is shown in an openable configuration.

A specific and preferred embodiment is shown in FIGS. 2 through 7. In this embodiment, lateral end 38 which includes outlet 28, can be completely opened. The end can swing down along end hinge 58. There can be a suitable latching means generally shown as reference character 60 to maintain the end 38 in a closed position as shown in FIG. 3. The latching means can be pivotally attached to an end flap 62 by pivot hinge 64. The latch can have a suitable configuration to have a locking portion 66 slide into slide opening 68. In this way, communication can be had with the pan chamber 53, the outlet 28 or the opening of lateral end 38.

The pan of the present invention, with the preferred embodiment as recited above, is particularly useful in a system as shown in FIG. 1. Such a system is directed to a specific type of railroad car adapted for gravity unloading of flowable particulate matters, such as soda ash, into an unloading pan. There is preferably a flexible hose 14 which can be inserted into the pan 12 through a small outlet 28 to pneumatically vacuum the particulate matter as it falls from the railroad car. Preferably, the vacuum is provided a hydrator 16 which receives the dry particulate material and forms a hydrated mixture which can be a solution or slurry of the particulate matter in water which can then be transferred by suitable means to a storage tank or for further processing. The preferred tank, as recited above, is designed to be used with specifically designed railroad cars which are commonly in operation and with hydrators which, in addition to hydrating, form a sufficient vacuum to draw the particulate matter through flexible hose 14 into the hydrator. A particularly preferred hydrator is described in U.S. Pat. No. 4,884,925 which is hereby incorporated by reference.

A preferred pan for use under a railroad car can have a large open inlet on top. The pan is relatively flat to slip under the railroad car. A typical pan is about 6 to 12 inches and preferably 4 to 8 inches high, with lateral ends 38 about 24 to 36 inches wide and lateral sides 36 about 48 to 71 inches long. A useful pan is 6 inches high by about 30 inches wide at end 38, by about 48 inches long at side 36.

The preferred hydrator comprises a liquid driven eductor 126. The eductor comprises an eductor liquid inlet 128, an eductor liquid outlet 130, and an eductor suction opening 132. The eductor has a venturi tube 127 which results in a pressure reduction at opening 132 when liquid flows from inlet 128 to 130.

Figure 9:
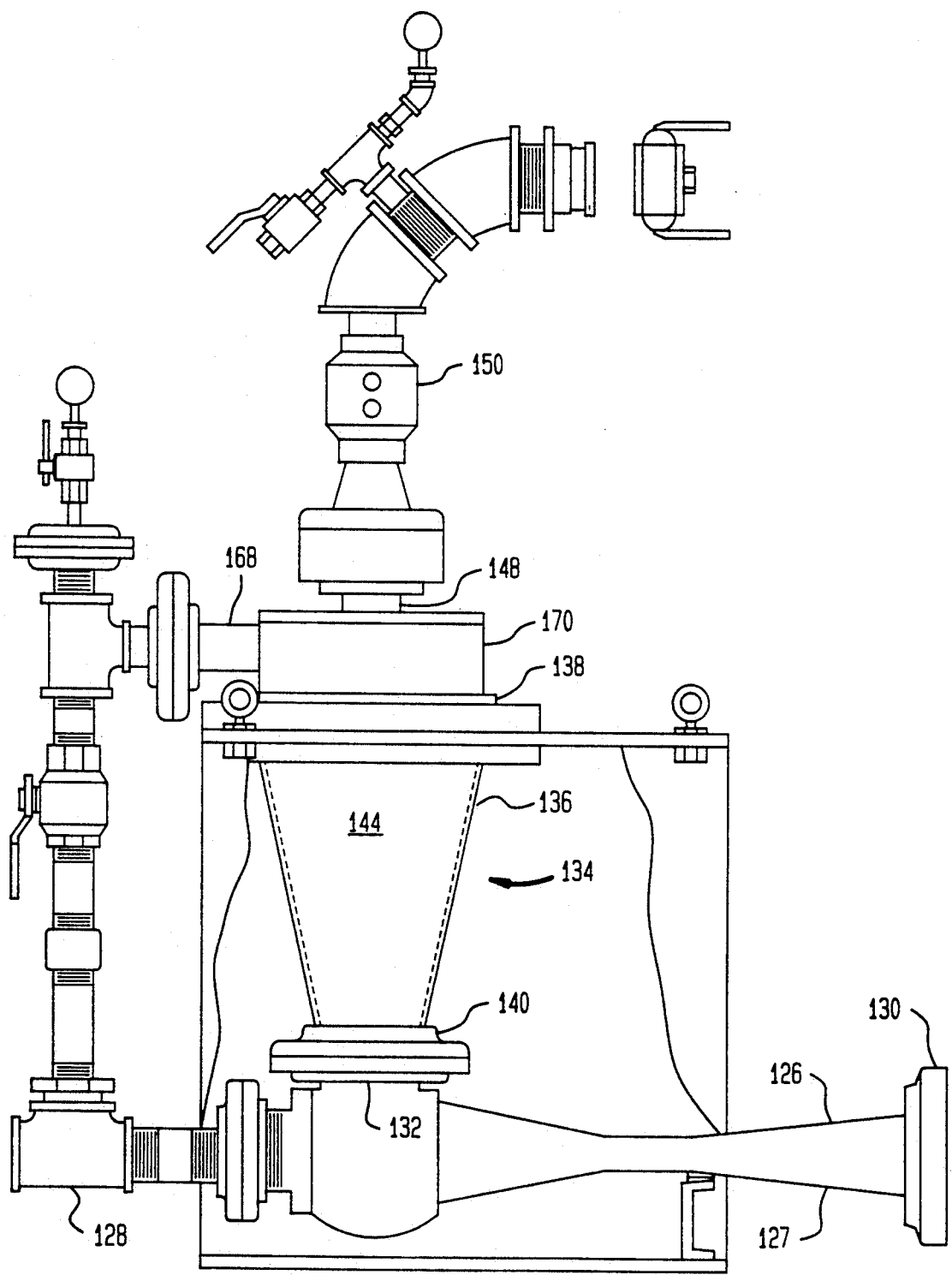
FIG. 9 is a side view of the hydrator.

There is preferably a solvation hopper 134 which comprises a hopper wall 136, a hopper inlet 138, and a hopper outlet 140. The hopper outlet 140 is connected to the eductor suction opening 132. Preferably the hopper is sealingly connected to the eductor suction opening at a hopper outlet flange connected through a sealing gasket to a suction opening flange as illustrated in FIG. 9.

The hopper wall 136 preferably defines a hopper chamber 144 in a continuous lateral enclosure. The hopper wall extends from the hopper inlet 138 to the hopper outlet 140.

There is suitable communication means between the hopper inlet 138 and the dry particulate solid container 10. Such means comprise a feed or hopper inlet conduit 148. Preferably the hopper inlet conduit is sealingly connected to the hopper inlet 138. The hopper inlet conduit communicates between the hopper chamber 144 and the solid particulate feed source, such as railroad car 10. As illustrated in FIG. 9, such communication can include a plurality of separate pieces including a swivel 150 and other flexible conduit elements to enable the hopper inlet conduit 148 to be interconnected to the railroad car 10.

In certain processes, such as those in which a slurry of soda ash is formed, it is desirable to hydrate the particulate solids as they are transferred into the hopper chamber 144. In order to do this, there are suitable means to feed a solvating liquid, which is preferably the same liquid used to drive the eductor into the hopper. Preferably, the solvating liquid is fed into the hopper through at least one, and preferably, a plurality of nozzles. Referring to FIGS. 9 and 10, there is a solvating liquid inlet conduit 168. The liquid is fed to the hopper chamber through solvating liquid inlet conduit 168. The inlet conduit communicates through manifold 170 to at least one nozzle conduit 172 and finally to nozzle 174. Preferably, the nozzles are disposed to spray the solvation liquid in a direction tangent to the hopper chamber interior wall at an angle to the axis of the hopper. In this way, the nozzles cause a spray of fluid to be directed in a swirling motion around the hopper wall as the fluid and particles mix and move down toward the eductor suction opening 132 of eductor 126. The solvating mixture of solvation liquid and solid particles formed in hopper chamber 144 is sent through eductor suction opening 132 in eductor 126 and is transferred to a suitable storage tank 22 or to direct chemical processing. It is preferred that the hydrating liquid in the hopper chamber 144 as well as the liquid used to drive eductor 126 be the same liquid. In this way, the same liquid can be used for a dual purpose and recycled. The hydrator 16 as described above is preferably used in the system as shown in FIG. 1.

In particular, particulate solids are fed from a container such as railroad car 10 into adapter pan 12 and drawn from the adaptor pan into the hydrator as disclosed above.

Figure 6:
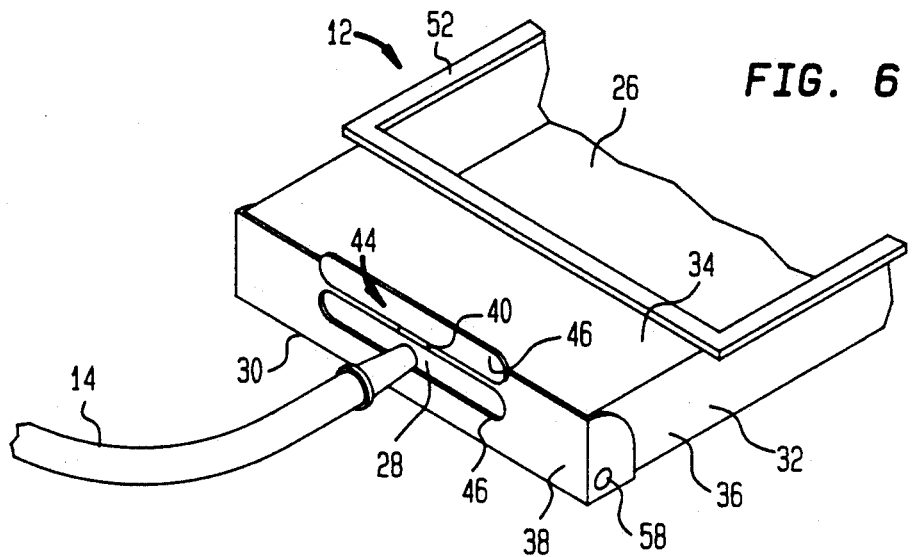
FIG. 6 is a view of the pan shown in FIG. 5 with the pan outlet port opened and a vacuum conduit inserted therein.
Figure 7:
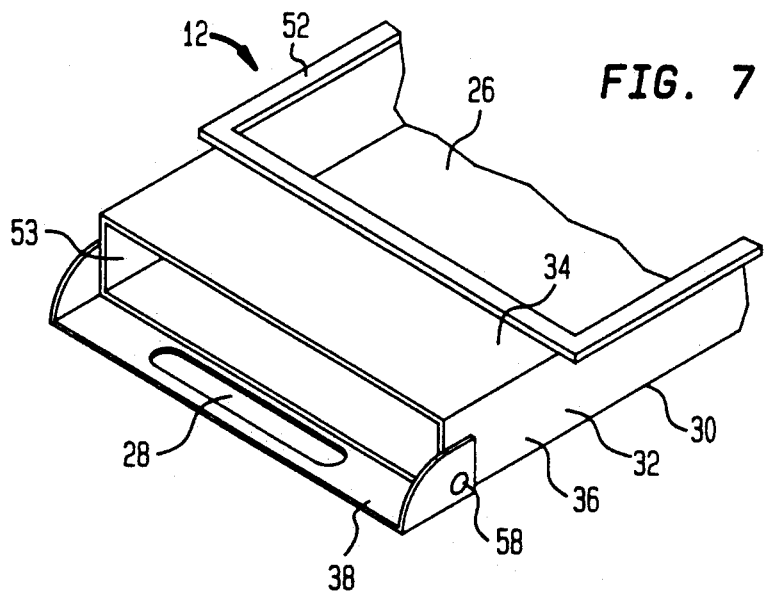
FIG. 7 is a view of the pan of FIG. 5 with the end wall in the down position so that the end is fully opened.
Figure 8:
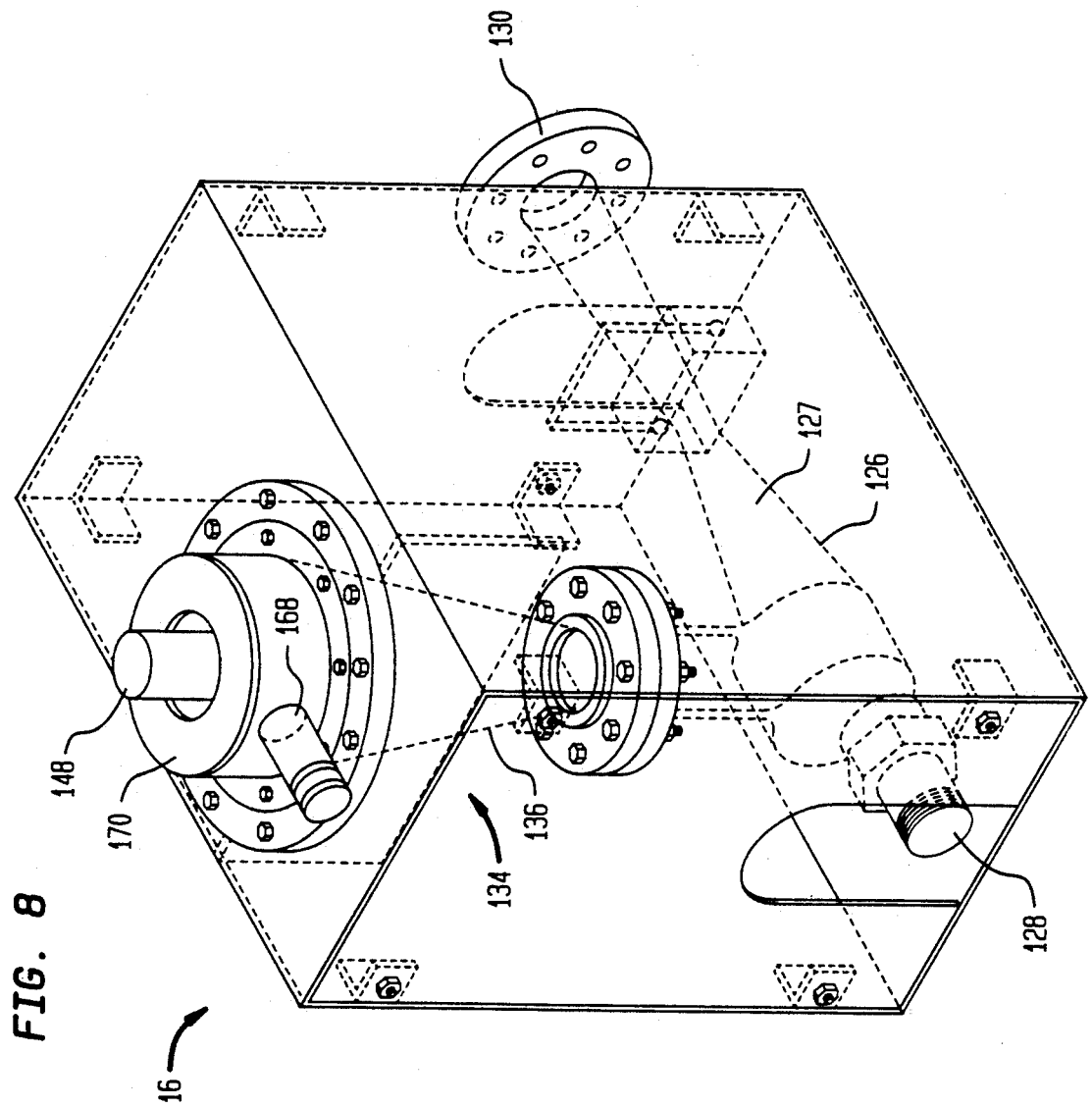
FIG. 8 is a view in perspective of a preferred hydrator useful in the system of the present invention.

The railroad car 10 is brought to a loading area and pan 12 is interconnected to the outlet of the railroad car. In accordance with the preferred apparatus, as recited above, the outlet of the railroad car is opened to communicate to the inlet of the pan with a minimum of play between the openings. In the preferred configuration, a flange around the inlet of the pan is inserted into corresponding grooves around the outlet in the railroad car. Alternatively, there can be a flange around the outlet of the railroad car which can be inserted into a corresponding groove around the inlet of the pan. Upon connecting the pan to the railroad car, the outlet of the railroad car is opened permitting the contents to fall into the pan. The pan is substantially enclosed so that a minimum of particulate matter and related dust can escape into the environment. The openable closure of the pan outlet is opened and a flexible hose 14, as shown in FIG. 6, is inserted into the opening. This results in a minimum of opening between the chamber 53 inside the pan and the environment. The flexible hose is a vacuum hose having a vacuum caused by the eductor in the hydrator. Upon sticking the hose into the inlet, the particulate matter flows into the hose and into the hydrator for continued processing. At any time, and typically at the unloading of railroad car 10, the end 38, as shown in FIG. 7, can be completely opened and the pan can be cleaned out before being disconnected. This can be conducted with a vacuum wand attached to the end of the flexible hose.

A useful hydrator comprises an eductor which causes a reduction of pressure at the suction opening of the eductor 126. Preferably the suction opening of the eductor is connected in communication with a hopper 134 having the hopper chamber 144 which in turn communicates with the adaptor. There is preferably a solvating liquid which is fed into the hopper chamber to form a hydrated mixture with the particulate solid. This hydrated mixture is drawn into the suction opening and exits from the eductor outlet 130.

The apparatus and method of the present invention are particularly useful in handling soda ash in the system as disclosed in U.S. Pat. No. 4,884,925. A preferred eductor is a four-inch eductor having three-inch diameter inlets and outlets. A preferred hopper is a conical shape hopper having a narrow diameter which fits into a four-inch suction opening at the hopper outlet and opens to an approximately ten-inch hopper diameter at the hopper inlet 138. The hoses used to bring the dry particulate powder to the hydrator are preferably three-inch flexible hoses. The slurry conduits are preferably three-inch diameter conduits.

During typical operation the pressure generated in the hopper and conduit 148 is in the range of from 20 to 25 inches of mercury.

The apparatus and method of the present invention is particularly useful with free flowing fine grained solids having a solid transport rate of about 0.085 pounds per minute or flake calcium chloride which has a value of 0.07 pounds per minute. Solid transport rate is defined in U.S. Pat. No. 4,884,925. The quantity of solvation liquid required to ensure smooth operation depends on the size of the solvation hopper, e.g., the larger the solvation hopper the more surface area is available for accumulation of hydrates, the orientation of nozzles, and on the dry chemical being handled. For non-hydratable dry chemicals such as activated carbon and sodium bicarbonates, smooth operation may be obtained without solvation liquid being supplied from the nozzles, although it is preferred that a small quantity be provided to keep all the interior wall of hopper chamber 144 clean for hydratable dry chemicals, such as soda ash, handled with the apparatus of this invention. The solvation liquid flow rate gallons per pound can be determined as disclosed in U.S. Pat. No. 4,884,925.

The flow rate for solvation liquid fed to nozzles is preferably be in the range of 0.05 to four times the quantity of the solvation liquid flow rate. The solid transport rate and the solvation liquid flow rate factors together determine the flow rate of said liquid. In this regard, low pressure nozzles rated at 60 psi or less, are useful on the high side of their range, and high pressure nozzles rated at 140 psi or more are useful on the low side of their range.

The volume of the hopper chamber should be sufficient so that there is sufficient residence time (generally 0.5 to 30 seconds) of the solvation liquid and solid in the hopper to form a desired slurry or solution.

The solvation liquid and eductor liquid are preferably selected for compatibility with the transport chemical and the intended use of the chemical. In many cases, just a solvent, for example, water, can be used as both liquids. If a slurry of soluble chemical is desired, on the other hand, it may be advantageous to employ a saturated solution of chemical as the solvation liquid, the eductor liquid or both.

While exemplary embodiments of the invention have been described, the true scope of the invention is to be determined from the following claims.

What is claimed is:

1. An unloading pan for collecting bulk dry particulate matter from a source, comprising:
   a pan container including a pan inlet and a pan outlet;
   attachment means for attaching said pan inlet to an outlet of said source, wherein said outlet of said source is substantially enclosed by said attachment means; and,
   said pan outlet further including an openable pan outlet closure, which is in a normally closed position and has an automatic closing means.

2. An unloading pan for collecting bulk dry particulate matter from a source, comprising:
   a pan container including a pan inlet and a pan outlet;
   attachment means for attaching said pan inlet to an outlet of said source, wherein said outlet of said source is substantially enclosed by said attachment means; and, said pan outlet further including an openable pan outlet closure, which is in a normally closed position and includes an automatic closing means, said automatic closing means further including a spring-loaded cap held in a normally closed position by a spring interconnected between said cap and said pan container.

3. An unloading pan for collecting bulk dry particulate matter form an outlet of a source, comprising:

a pan container including a pan inlet and a pan outlet, said pan outlet including an openable pan outlet closure which is in a normally closed position; and attachment means for attaching said pan inlet to said outlet of said source, wherein said outlet of said source is substantially enclosed by said attachment means.

4. An unloading pan of claim 3 wherein said pan container further includes:

a base;

at least one lateral wall attached to said base, said at least one lateral wall forming an enclosed perimeter; and, a top attached to said at least one lateral wall opposite said base, said top having said pan inlet therein which passes through said top.

5. The unloading pan of claim 4 wherein said pan outlet is located in said at least one lateral wall.

6. The unloading pan of claim 4 wherein said at least one lateral wall further includes two opposing sides and two opposing ends, said enclosed perimeter being a rectangular perimeter.

7. The unloading pan of claim 6 wherein temporary opening means open at least part of one of said opposing ends.

8. The unloading pan of claim 6 wherein said pan outlet is located in one of said opposing ends.

9. The unloading pan of claim 8 wherein said openable pan outlet closure further includes a temporary opening means located in one of said opposing ends.

10. A system for collecting and transferring bulk dry particulate matter, comprising:

(a) a storage container for said bulk dry particulate matter including a storage container outlet;

(b) an unloading pan for said bulk dry particulate matter comprising:

(i) a pan container including a pan inlet and a pan outlet, said pan outlet further including an openable pan outlet closure which is in a normally closed position; and, (ii) attachment means for attaching said pan inlet to said storage container outlet, wherein said storage container outlet is substantially enclosed by said attachment means;

(c) a hydrator comprising:

(i) drawing means for drawing said bulk dry particulate matter from said pan container through said pan outlet and to said hydrator, wherein said pan outlet is in communication with said hydrator; and, (ii) hydrating means for hydrating said bulk dry particulate matter and forming hydrated particulate matter; and, (d) transferring means in communication with said hydrator for transferring said hydrated particulate matter form said hydrator.

11. The system of claim 10 wherein the drawing means and the hydrating means further comprise:

a solvation hopper comprising a hopper wall, a hopper inlet, and a hopper outlet;

a hopper inlet conduit sealingly communicating with said solvation hopper through said hopper inlet, said hopper inlet conduit in sealed communication with said pan container through said pan outlet; and, a liquid driven eductor comprising an eductor liquid inlet, an eductor outlet, and an eductor suction opening, said eductor suction opening in sealed communication with said hopper outlet.

12. The system of claim 11 further including a slurry storage tank in communication with said eductor outlet.

13. The system of claim 12 wherein said transferring means further comprises to transfer said hydrated particulate matter between said slurry storage tank and said eductor outlet.

14. The system of claim 11 wherein said pan container further includes:

a base;

at least one lateral wall attached to said base, said at least one lateral wall forming an enclosed perimeter; and, a top attached to said at lest one lateral wall opposite said base, said top having said pan inlet therein which passes through said top.

15. The system of claim 14 wherein said at least one lateral wall further comprises two opposing sides and two opposing ends, said enclosed perimeter being a rectangular perimeter.

16. The system as recited in claim 15 further comprising opening means for opening at least part of one of said opposing ends.

17. The system as recited in claim 15 wherein said pan outlet is located in one of said opposing ends.

18. The system as recited in claim 17 further comprising opening means for opening one of said opposing ends.

19. A dry bulk particulate solids transfer method comprising the steps of:

connecting an unloading pan to and outlet of a source of dry bulk particulate solids, wherein said unloading pan includes a pan container, a pan inlet and a pan outlet, and said connecting includes connecting said pan inlet to said source of dry bulk particulate solids by a means to minimize dust upon transfer of said dry bulk particulate solids through said pan inlet and into said pan container, and said connecting further includes substantially enclosing said outlet of said source with said means to minimize dust, said pan outlet further including an openable pan outlet closure in a normally closed position;

opening said pan outlet tin communication with a hydrator for hydrating said dry bulk particulate solids;

drawing said dry bulk particulate solids from said source through said pan outlet and into said hydrator; and, closing said pan outlet upon breaking communication with said hydrator.

20. The method as recited in claim 19 further comprising the steps of:

opening at least a portion of at least one lateral wall of said pan container; and, cleaning a pan chamber of said pan container.

21. The method as recited in claim 19 wherein said hydrator includes a liquid eductor which draws said dry bulk particulate solids by vacuum, said liquid eductor including a suction opening, the method further comprising the steps of:

passing a liquid stream through said liquid eductor; and, wherein the drawing step further includes drawing said dry bulk particulate solids through a feed conduit communicating with said pan outlet and into said liquid eductor through said suction opening of said eductor.

22. The method as recited in claim 21 further comprising the step of feeding said particulate solids from said feed conduit to a hopper of said hydrator; and, wherein the step of drawing further comprises the transfer of said particulate solids between said hopper and said suction opening of said eductor.

23. The method as recited in claim 22 further comprising the step of hydrating said particulate solids in said hopper.

* * * * *